US008832468B2

(12) United States Patent
Pop et al.

(10) Patent No.: US 8,832,468 B2
(45) Date of Patent: Sep. 9, 2014

(54) POWER MANAGEMENT SYSTEM FOR WIRELESS AUTONOMOUS TRANSDUCER SOLUTIONS

(75) Inventors: Valer Pop, Eindhoven (NL); Frank Bouwens, Veldhoven (NL); Li Huang, Eindhoven (NL); Guido Dolmans, Son en Breugel (NL); Rene Elfrink, Waalre (NL); Ruud Vullers, Waalre (NL)

(73) Assignee: Stichting IMEC Nederland, Eindhoven (NL)

(*) Notice: Subject to any disclaimer, the term of this patent is extended or adjusted under 35 U.S.C. 154(b) by 244 days.

(21) Appl. No.: 13/174,396

(22) Filed: Jun. 30, 2011

(65) Prior Publication Data

US 2012/0030486 A1 Feb. 2, 2012

Related U.S. Application Data

(60) Provisional application No. 61/361,261, filed on Jul. 2, 2010.

(51) Int. Cl.
*G06F 1/00* (2006.01)
*G06F 1/26* (2006.01)
*G06F 1/32* (2006.01)
*G01D 21/00* (2006.01)

(52) U.S. Cl.
CPC ..................................... *G01D 21/00* (2013.01)
USPC ............................ 713/300; 713/320; 713/340

(58) Field of Classification Search
CPC ...... G04C 10/00; H02J 1/10; H04W 52/0261; Y02B 60/10; G06F 1/32; G06F 1/3206; G06F 1/3212; G06F 11/3062
USPC ........................................... 713/300, 320, 340
See application file for complete search history.

(56) References Cited

U.S. PATENT DOCUMENTS

| 5,539,925 | A | 7/1996 | Yli-Kotila et al. |
| 6,463,042 | B1 | 10/2002 | Paatelma |
| 6,693,851 | B1 * | 2/2004 | Fujisawa et al. ............... 368/203 |
| 7,073,079 | B1 * | 7/2006 | Karsi et al. .................... 713/320 |
| 7,536,570 | B2 * | 5/2009 | Leung et al. .................. 713/300 |

(Continued)

FOREIGN PATENT DOCUMENTS

| AU | 2007203010 | 7/2007 |
| EP | 1881301 A2 | 1/2008 |
| WO | WO 03/034366 A1 | 4/2003 |

OTHER PUBLICATIONS

Citizen Watches Co Ltd / FAQ, Jun. 28, 2010, http://web.archive.org/web/20100628171303/http://www.citizen.com.hk/en/about-us/technology/eco-drive/q-a.*

(Continued)

*Primary Examiner* — Mark Connolly
(74) *Attorney, Agent, or Firm* — Knobbe Martens Olson & Bear LLP

(57) ABSTRACT

An autonomous transducer system is disclosed. In one aspect, the system includes an energy scavenging module, energy storage module, a load circuit having at least one functional block providing a given functionality, and a power management module arranged for providing power supplied by the energy scavenging module to the load circuit or for exchanging power with the energy storage module. The power management module may further include a tuning module configured to tune the at least one functional block of the load circuit according to a given configuration scheme.

17 Claims, 18 Drawing Sheets

(56) References Cited

U.S. PATENT DOCUMENTS

| | | | |
|---|---|---|---|
| 2007/0129045 A1 | 6/2007 | Aerrabotu | |
| 2007/0191076 A1* | 8/2007 | Hageman et al. | 455/574 |
| 2009/0259421 A1 | 10/2009 | Pop et al. | |
| 2010/0076714 A1 | 3/2010 | Discenzo | |

OTHER PUBLICATIONS

U200_EN-final.indd, Apr. 24, 2008, pp. 1-48.*
Citizen Watch Global Network, Service | Support | FAQ, Mar. 1, 2003, www.citizenwatch-global.com/faq/faq.htm.*
X. Jiang et al., "An Architecture for Energy Management in Wireless Sensor Networks", Newsletter ACM Sigbed Review—Special Issue on the Workshop on Wireless sSensor Network Architecture, vol. 4, No. 3, Jul. 31, 2007.
M. Vidojkovic, et al., "A 500 µW 5 Mbps Super-regenerative RF Front-End", European Solid-State Circuits Conference (ESSCIRC), Seville, Spain, Sep. 2010.
L. Huang, et al., "Performance Evaluation of an Ultra-Low Power Receiver for Body Area Networks (BAN)", Personal, Indoor and Mobile Radio Conference (PIMRC), Istanbul, Turkey, Sep. 2010.
K. Philips et al., "An Inductorless, 1 mm2 Transceiver for Coherent Impulse Radio UWB with Signal-Level Duty-Cycling," Custom Integrated Circuits Conference (CICC), San Jose, CA, USA, Sep. 2010.
S.P. Beeby, M.J. Tudor, N.M. White, "Energy harvesting vibration sources for Microsystems applications", Measurement Science and Technology J., vol. 17, pp. 175-195, 2006.
K.A. Cook-Chennault, N. Thambi and A.M. Sastry, "Powering MEMS portable devices", Smart Materials and Structures J., vol. 17, pp. 043001, 2008.
B. Op het Veld, D Hohlfeld, V. Pop, "Harvesting mechanical energy for ambient intelligent devices", Information Systems Frontiers J., Feb. 26, 2009, Springer Science + Business Media, LLC 2009.
V. Pop et al., "Battery Management Systems: Accurate State-of-Charge Indication for Battery-Powered Applications", $1^{st}$ ed. vol. 9, Ed. New York: Springer Academic Publishers, 2008.
R.J.M. Vullers, R. Van Schaijk, I. Doms, C. Van Hoof and R. Mertens, "Micropower energy harvesting", Solid state electronics, vol. 53, pp. 684, 2009.
M. Hempstead, N. Tripathi, P. Mauro, G.-Y. Wei, and D. Brooks, "An Ultra Low Power System Architecture for Wireless Sensor Network Applications", International Symposium on Computer Architecture (ISCA-05), Madison, WI, USA, Jun. 2005.
J.R. Whitehead, "Super-Regenerative Receivers", Cambridge Univ. Press, 1950.
Texas Instruments: MSP430, www.ti.com, printed on Jan. 24, 2013.
Motoyasu Shirasaki et al. "A 45nm Single-Chip Application-and Baseband Processor Using an Intermittent Operation Technique", IEEE International Solid-State Circuits Conference, ISSCC2009, Feb. 10, 2009, pp. 156-157.
Greenpeak, www.greenpeak.com, printed on Jan. 24, 2013.
European Search Report for European Patent Application No. 10178942.8-1236 issued on Jan. 19, 2011 by European Patent Office.
Niyato et al., "Wireless sensor networks with energy harvesting technologies: a game-theoretic approach to optimal energy management", IEEE Wireless Communications, IEEE Service Center, Piscataway, NJ, US, vol. 14, No. 4, Aug. 1, 2007, pp. 90-96.

* cited by examiner

POWER MANAGEMENT SYSTEM FOR WIRELESS AUTONOMOUS TRANSDUCER SOLUTIONS

CROSS REFERENCE TO RELATED APPLICATIONS

This application claims priority under 35 U.S.C. §119(e) to U.S. provisional patent application 61/361,261 filed on Jul. 2, 2010, which application is hereby incorporated by reference in its entirety.

BACKGROUND OF THE INVENTION

1. Field of the Invention

The disclosed technology generally relates to devices having energy scavenging modules that employ efficient power management operations.

2. Description of the Related Technology

Low-power consumption and small volume are key demands for wireless autonomous transducer solutions (WATS) architectures. This demand is a motivation to work on various advanced miniaturized energy systems (ES) that can efficiently deliver power to demanding applications. To enable autonomy these systems need to be efficiently combined with low-power consumption electronics.

It is critical to maximize the autonomy, while satisfying user performance requirements. Commercially available wireless sensor platforms often rely on general purpose processors and standard radios, such as ZigBee or Bluetooth radios, which lead to high power consumption. Typically such applications have power consumption values in the order of tens of mW in active modes. As a result, their application is constrained to battery-operated systems, thus having a limited autonomy. Research efforts for WATS have been focused on power optimization at block level in the past: ultra-low power radios, energy harvesters, batteries and power management circuits. In order to improve the integration efficiency and achieve increased autonomy WATS architectural modeling becomes necessary. Previous work on energy management architectures has been reported in X. Jiang, J. Taneja, J. Ortiz, A. Tavakoli, P. Dutta, J. Jeong, D. Culler, P. Levis, and S. Shenker, "An Architecture for Energy Management in Wireless Sensor Networks," *International Workshop on Wireless Sensor Network Architecture*, Cambridge, Mass., USA, April 2007. The basic idea behind this architecture is to reduce the overall power consumption, switching to low-power modes at block level when possible, while satisfying application constraints.

SUMMARY OF CERTAIN INVENTIVE ASPECTS

Certain inventive aspects relate to a transducer system with increased autonomy, and further to a method for managing the power budget of such a transducer system.

One inventive aspect relates to an autonomous transducer system. The system comprises an energy scavenging module, energy storage module, a load circuit comprising at least one functional block providing a given functionality and a power management module arranged for providing power supplied by the energy scavenging system to the load circuit or for exchanging power with the energy storage module. The power management module further comprises a tuning module configured to tune the at least one functional block of the load circuit according to a given configuration scheme.

Furthermore, the power management module comprise a budget module configured to determine a power budget based on information of the power supplied by the scavenging module and of power consumed by the functional blocks. In particular, the given configuration scheme is at least partly selected based on the power budget.

In an embodiment the given configuration scheme is at least partly selected based on external setting means and/or user defined parameters.

In an embodiment the at least one functional block of the load circuit comprises a plurality of tunable parameters for setting the given configuration scheme.

In an embodiment the power management module further comprises circuitry for measuring the temporal voltage behavior of the energy storage system and wherein the temporal voltage behavior is taken into account in the given configuration scheme.

In another aspect a method for managing the power budget of an autonomous transducer system is presented. The system comprises an energy scavenging module, an energy storage system, a load circuit comprising at least one functional block providing a given functionality and a power management module arranged for providing power supplied by the energy scavenging system to the load circuit or for exchanging power with the energy storage. The method comprises a) determining a power budget based on information of the power supplied by the scavenging system and of power consumed by the at least one functional block and b) tuning the given functionality according to a given configuration such that the power budget is positive, i.e. the consumed power does not exceed the supplied power. In several embodiments, the step of tuning can comprise adapting the sampling frequency of an analog to digital converter, adapting the frequency of transmission and/or reception.

In an embodiment the step of determining a power budget takes the dynamic power consumption and the leakage power of the functional blocks into account, for example the dynamic power consumption and/or leakage power of a microcontroller or the dynamic power consumption and/or leakage power of sensors.

In an embodiment the step of determining a power budget takes storage properties of the energy storage system into account, for example the state of charge of the energy storage system or the battery maximum capacitance or the efficiency of power manager.

A 'power generation consumption' diagnosis tool has been developed. By applying this tool the key power consumers at the WATS architectural level are identified. In other words, the average power consumption is substantially continuously compared with the power generated by the energy scavenging system. The aim is to learn and to implement optimum power generation-power consumption (positive power budget). This modeling approach is effective for improving the WATS autonomy. The system functionality can be adapted to the application environment.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION OF CERTAIN ILLUSTRATIVE EMBODIMENTS

Figure 1A:
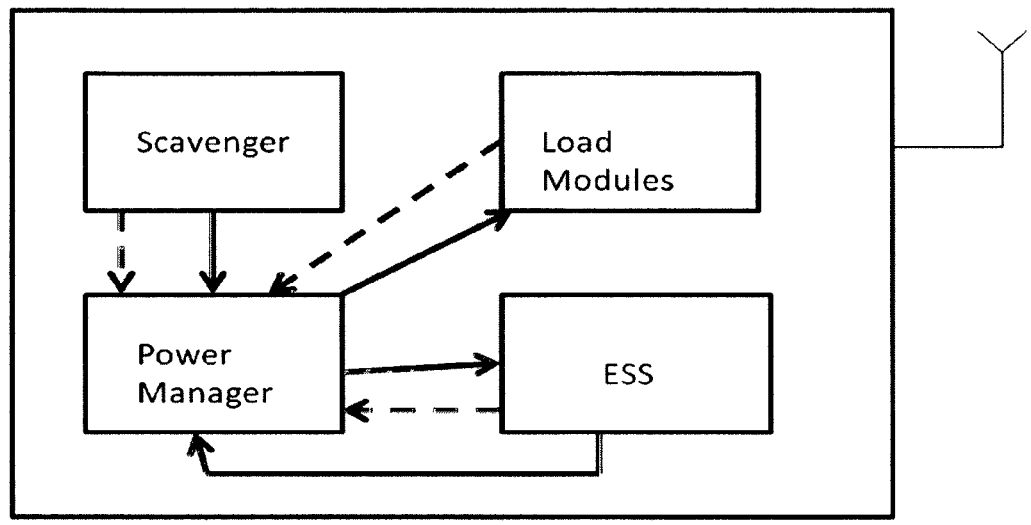
FIG. 1*a* and FIG. 1*b* show autonomous transducer systems according to one embodiment.

The present disclosure will be described with respect to particular embodiments and with reference to certain drawings but the disclosure is not limited thereto. The drawings described are only schematic and are non-limiting. In the drawings, the size of some of the elements may be exaggerated and not drawn on scale for illustrative purposes.

Furthermore, the terms first, second, third and the like in the description, are used for distinguishing between similar elements and not necessarily for describing a sequential or chronological order. The terms are interchangeable under appropriate circumstances and the embodiments of the disclosure can operate in other sequences than described or illustrated herein.

Moreover, the terms top, bottom, over, under and the like in the description are used for descriptive purposes and not necessarily for describing relative positions. The terms so used are interchangeable under appropriate circumstances and the embodiments of the disclosure described herein can operate in other orientations than described or illustrated herein.

The term "comprising" should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting of only components A and B. It means that with respect to the present disclosure, the only relevant components of the device are A and B.

FIG. 1a shows an autonomous transducer system according to one embodiment. The system comprises an energy scavenging module, an energy storage system (ESS), a load circuit comprising one or more functional blocks or load modules providing a given functionality and a power management module arranged for providing energy supplied by the energy scavenging system to the load circuit and/or for exchanging energy with the ESS. The power management module further comprises a module for tuning the at least one functional block of the load circuit according to a given configuration scheme.

Figure 1B:
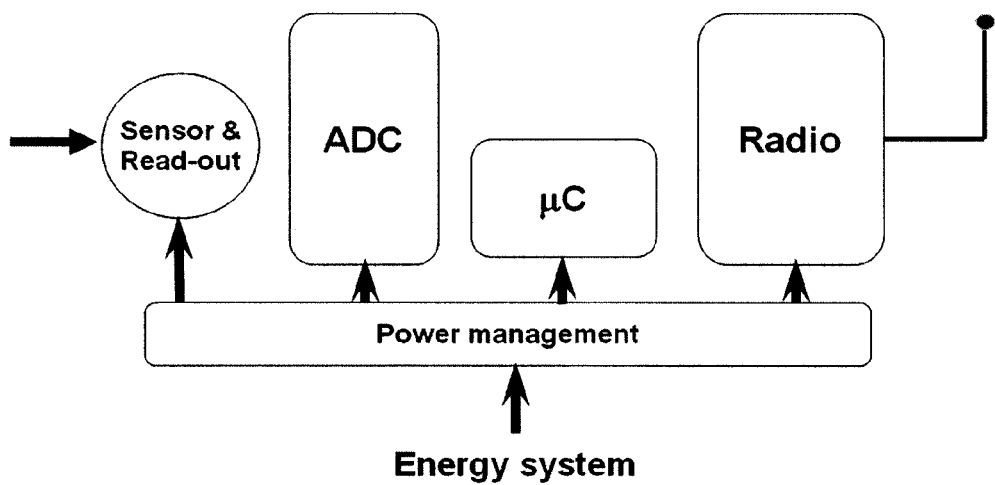

FIG. 1b shows a more detailed example of an autonomous transducer system, comprising typical load modules for a wireless autonomous transducer system (WATS). The power management module deals with the conversion between the energy system (energy harvester and storage) and the electronics. The basic task of the energy scavenger or harvester is to convert ambient energy into electrical energy. The ESS can be a battery and stores the irregular energy obtained from the harvester and copes with the high crest factor (peak/RMS current) of the load current caused by sensing and/or read-out circuitry, Analog-to-Digital converter (ADC), microcontroller (μC) and radio. The μC carries out low level processing of the sensed signal, which the radio can transmit wirelessly to for example a central processing node.

In WATS the power budget ($P_b$) should be larger than or equal to 0. This is denoted as 'autonomy condition' and is given by $$P_b = P_g - P_c > 0 \qquad \text{Equation 1}$$

where $P_g$ denotes the generated power (typically expressed in [μW]) and $P_c$ the consumed power (also typically expressed in [μW]).

The generated power comprises a contribution of the energy harvester—energy storage (optional), i.e. battery or supercapacitor. Examples of energy harvesting technologies are photovoltaic (PV), thermal, RF and vibrational. The consumed power is typically the power consumed by the load circuit but also caused by a contribution of the leakage power. The load circuit comprising sensing and/or read-out circuitry (for example for sensing a temperature, for reading out biopotential signals), an ADC (for example a SAR ADC), a microcontroller and a radio arranged for wirelessly transmitting or receiving signals (for example proprietary 2.4 GHz, Zigbee, BAN radio, Impulse radio, UWB).

The power consumption considered here comprises a contribution of the standby and active power. The application transmission ($T_{Tx}$) and sampling periods ($T_s$) are important factors that influence the impact of the active and standby power in the total power consumption. To quantify this impact the current consumption for two WATS systems will be briefly discussed.

Figure 2:
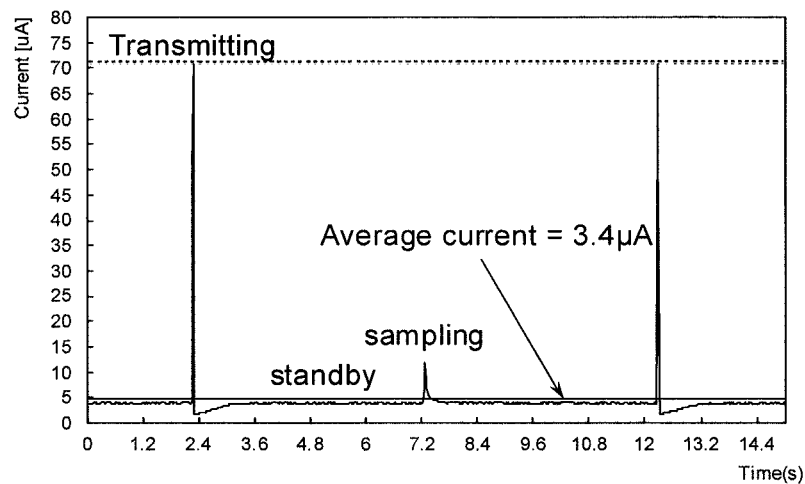
FIG. 2 shows a plot illustrating the typical power consumption of a WATS (zoom-in FIG. 3).

In a first example, the current consumption measurement for a WATS system designed with off-the-shelf electronics is shown in FIG. 2. The WATS system functionality is to perform a temperature measurement every 5 seconds and wirelessly transmit the corresponding information every 10 seconds. This type of WATS systems may be applied in the environmental or industrial monitoring domains. The measured average current consumption equals 3.4 µA, where more than 95% of this value is represented by the standby current. This is explained by a longer period of time that the WATS system spends in the standby state, i.e. 9999 ms, when compared with the one in active (transmission and sampling) state, i.e. 1 ms.

Figure 3:
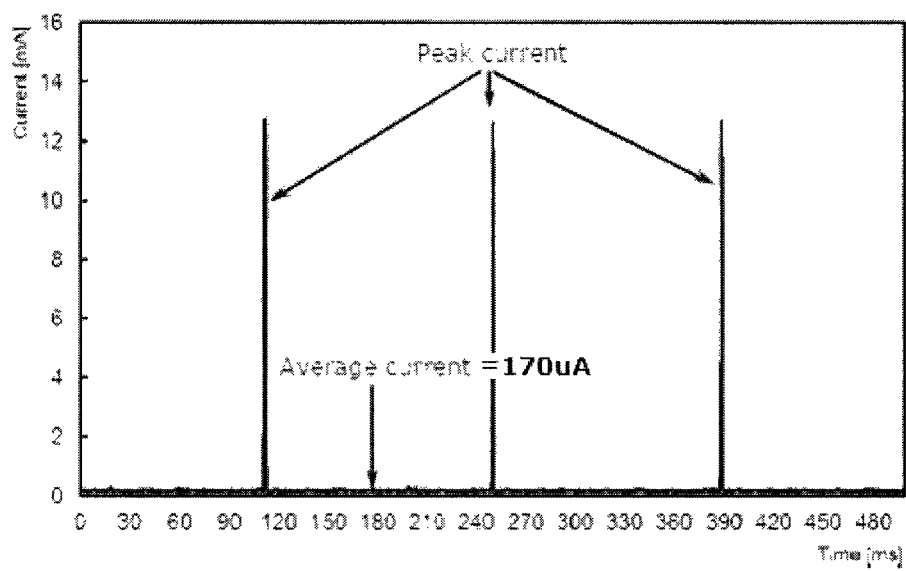
FIG. 3 shows a plot illustrating the typical power consumption of a WATS (zoom-out FIG. 2)._

In a second example, the current consumption measurement for a WATS system is shown in FIG. 3. The WATS system functionality is to perform an ElectroMyoGram (EMG) measurement every 2 ms and wirelessly transmit the corresponding information every 140 ms. This type of WATS system may be applied in body area networks. Similar with the first example, the contribution of the active and average current consumption are included in FIG. 3. It follows from this figure that the average current consumption equals 170 µA, where more than 95% of the total power is consumed during the active state. This may be explained by fast repetition of the $T_{Tx}$ and $T_s$.

Figure 4:
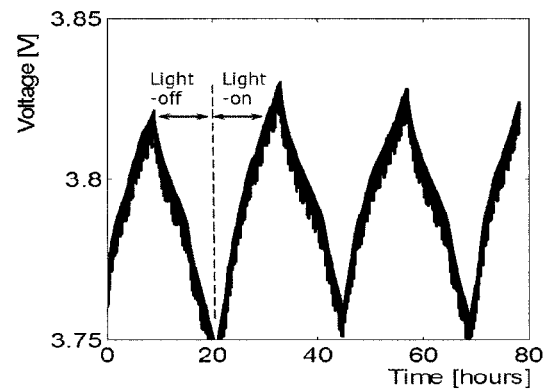
FIG. 4 plots a battery charging process whereby the energy is generated by a photovoltaic harvester device.

In order to enable autonomy PV energy harvesting can be integrated in this WATS system. In this case, during a 'Light-on' time period the energy generated by the PV harvester is used for charging a battery and power the WATS system. A power management circuit may assure proper charging and protection of the battery. During a 'Light-off' time period the WATS system is powered only by the battery. A second power management circuit may regulate the battery voltage to the voltage supply needed for powering the WATS electronic components, i.e. microcontroller, radio, Analog-to-Digital converter (ADC). It follows from FIG. 4 that the measured average battery voltage remains constant during the complete WATS system test. So, the power budget meets the condition given by Equation 1 and the system is autonomous.

To obtain information on the power consumption and generation at system level an architectural power diagnosis tool has been developed. The tool identifies the key power consumption blocks at architectural level and quantifies the importance of the energy harvesting and low-power electronics technologies within a certain application domain. The application conditions at the energy harvesting and electronics levels are the inputs for the power diagnosis tool and determine the given configuration scheme according to which at least one functional block of the load circuit can be tuned. For example, the radio reception (Rx) and transmission (Tx) intervals and the ADC sampling interval are some of the important input parameters defined within the diagnosis tool and can also be tuned according to a given configuration scheme. Another input is the distance range that the application requires. For a given set of input application parameters the tool selects the power modes at each described block, i.e. radio, µC, etc., so that the overall power consumption at the architectural level is minimized. For this the tool takes into account transition times between modes and the input application Tx/Rx intervals. The output is a diagnosis of the power consumption and autonomy under the application specific conditions at architectural level. Therefore, all functional blocks will be discussed below and a solution or a configuration scheme will be given providing the most, optimal power budget management. The scheme can also take the properties and behavior of the ESS into account. The scheme proposes the settings in the functional blocks. In addition, the configuration scheme can also be (at least partly) selected based on external setting modules and/or user defined parameters. Some settings of functional blocks can be selected by a user (for example user sets instances of transmission or user can indicate that system may not work when the power budget is below a predetermined value).

Figure 5:
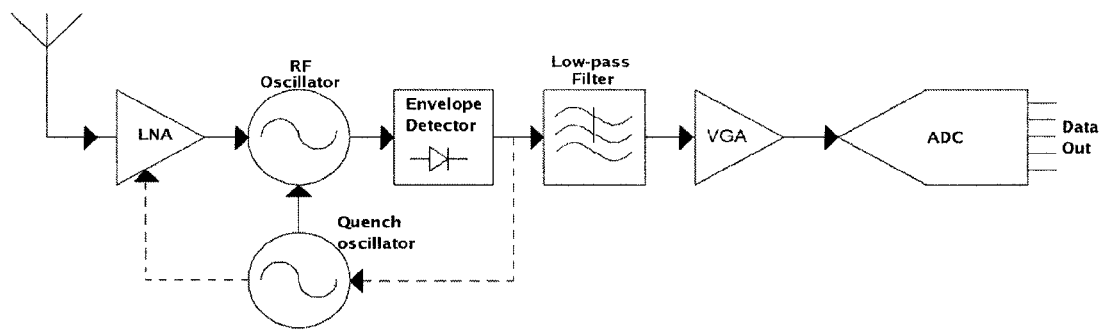
FIG. 5 shows a block diagram of a receiver architecture.

One of the power consuming blocks of a WATS is for example the radio. To illustrate that the change of values of different register parameters in a radio system significantly affects the radio power consumption ($P_{radio}$), a superregenerative receiver is considered. As shown in FIG. 5, the main block is the radio frequency (RF) oscillator which periodically starts up and shuts off oscillation controlled by a quench oscillator. The power consumption of the quench oscillator depends on its chosen operating stage (N). The stage is determined by the current in the digital-to-analog converter (DAC) in the quench oscillator, which could be pre-controlled in a number of steps. For example, for a 32-step quench oscillator, a 10 µA current consumption difference is measured between adjacent steps. Measurement results show that the total current consumption including the low-noise amplifier (LNA), RF oscillator, quench oscillator and envelop detector (see FIG. 6) could be ranged from 152 to 462 µA dependent on the chosen stage in the quench oscillator. This result means that for a voltage of V power supply ($V_{dd}$), the active power consumption ranges from 182.4 to 554 µW. So, the actual power consumption of the radio could be estimated by reading the operating stage register N by $$P_{radio}=V_{dd}*(152\text{ uA}+(N-1)*10\text{ uA}) \qquad \text{Equation 2}$$

Figure 6:
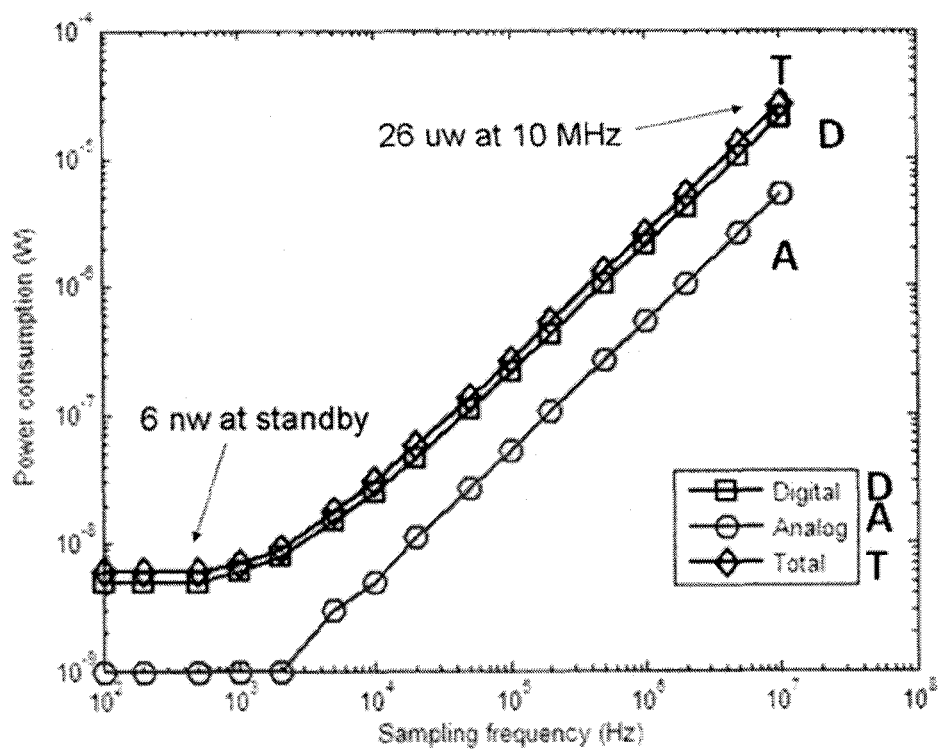
FIG. 6 shows a plot of the power consumption of an analog-to-digital converter.

Another example (i.e. another power consuming block) illustrates the power consumption of the ADC ($P_{ADC}$), which is determined as a function of the sampling frequency. This power consumption comes from both the analog and digital part. For the superregenerative receiver measurement results are shown in FIG. 6 and learn that the power scales linear with the sampling frequency, down to 6 nW at standby. For a sampling frequency (f) of 10 MHz, the total power equals 26 µW. Using a least-squares fitting technique, the following equations are obtained $$\begin{cases} P_{ADC} = 6 \times 10^{-9} & \text{if } f < 500 \text{ Hz} \\ P_{ADC} = 2 \times 10^{-12} f + 5 \times 10^{-9} & \text{if } 500 \text{ Hz} \le f \le 5000 \text{ Hz} \\ P_{ADC} = 2.57 \times 10^{-12} f + 2.5 \times 10^{-8} & \text{if } f > 5000 \text{ Hz} \end{cases} \qquad \text{Equation 3}$$

The power consumption of the microcontroller (µC) is composed of dynamic (or active) and leakage power consumption. The active microcontroller power consumption ($P_{\mu C}$) may be determined by $$P_{\mu C}{}^{Dyn}=CV_{dd}^2 f_{CLK}\alpha \qquad \text{Equation 4}$$

where C denotes the design capacitance, $V_{dd}$ denotes the µC supply voltage in [V], $f_{CLK}$ denotes the clock frequency in [Hz]. α denotes the average switching activity factor and is directly related to $T_{Tx}$ and $T_s$.

The µC leakage power consumption is determined by $$P_{\mu C}{}^L = V_{dd} I_{\mu C}{}^L \qquad \text{Equation 5}$$

where $I_L$ denotes the leakage or the OFF state current in [µA] and may be determined by predefined measurements.

Figure 7:
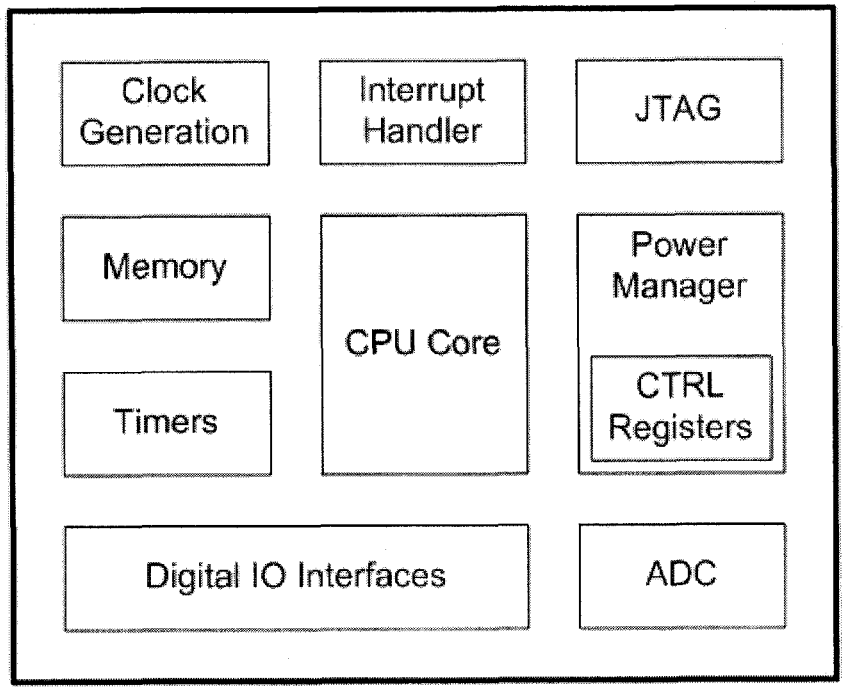
FIG. 7 illustrates a possible CPU architecture.
Figure 8A:
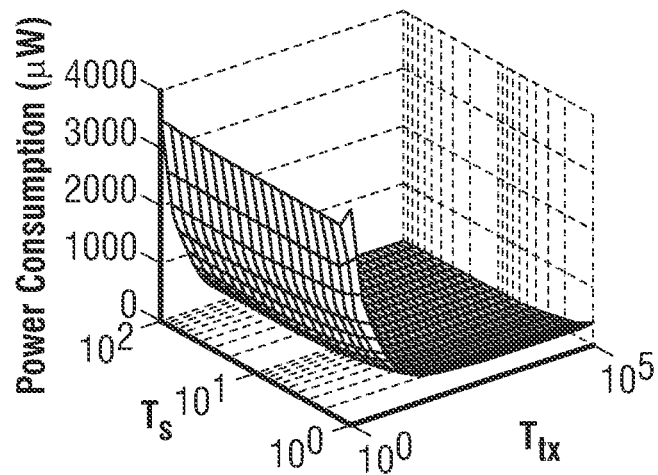
FIG. 8 shows plots illustrating the power trends (a) and autonomy duration (b,c) with (c) and without (b) an energy harvester.
Figure 8B:
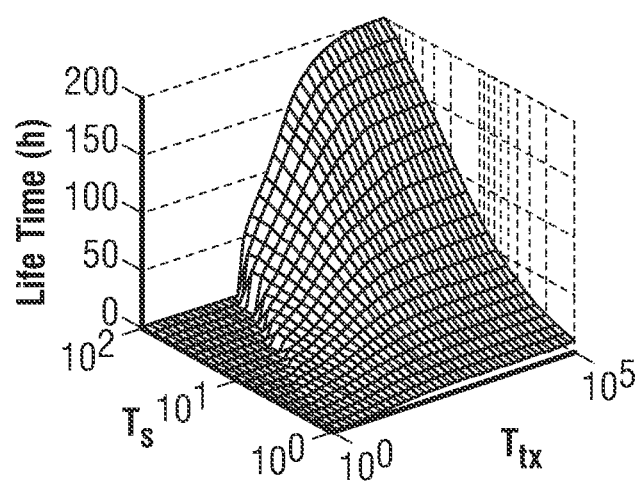
Figure 8C:
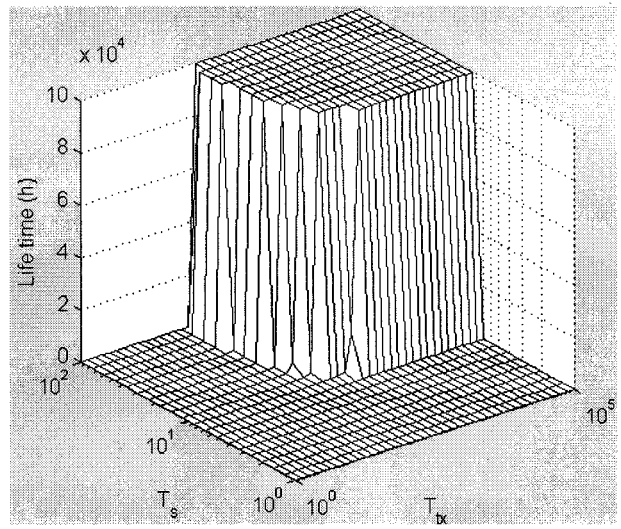

An example of regular central processing unit (CPU) architecture is depicted in FIG. 7, where the power modes and their power consumption at $V_{dd}$ of 2.2 V are shown in the table 1.

TABLE 1

| Power Modes | Operation description | Nominal power Consumption [μW] |
| --- | --- | --- |
| Active at 1 MHz clock | CPU on, all clocks active | 616 |
| LPM3 32 KHz clock | Only power manager enabled | 2 |
| LPM4 | CPU off (only leakage power) | 0.3 |

The architecture consists of a CPU core for calculations and control of its periphery and surroundings. These components normally operate in an always on mode, which can be high energy consuming in idle operation. To minimize energy consumption the CPU Core is able to control the power status of the peripherals and the core itself. In this way dynamic and leakage power can be minimized. As an example, when the standby state time period is much longer than the active time period most of the peripherals and the CPU can be powered down putting the microcontroller in a sleep mode. The on-chip power manager would wake-up the relevant components and/or CPU when an (external) event occurs such as a timer or signal input. The power modes for the microcontroller can be programmed by the engineer by setting the control (CTRL) registers in the power manager.

The power control of the peripherals targets to minimize dynamic and leakage power consumption. This may be realized with clock gating and power gating. Power gating connects a device to a power supply via a switch and is very suitable for applications with long standby periods where leakage power is the dominant factor of the entire power budget (see FIG. 2). Significant power savings can be made in systems where the leakage power takes 95% or more of the budget. When a component is power gated the switch is opened and the device is physically disconnected from the power supply. This method may have a long duration for powering up and loss of configuration after powering up the device. This former requires intelligent control to determine which and what mode to set, while the latter requires re-programming the configuration when the device's power is stable.

Figure 9:
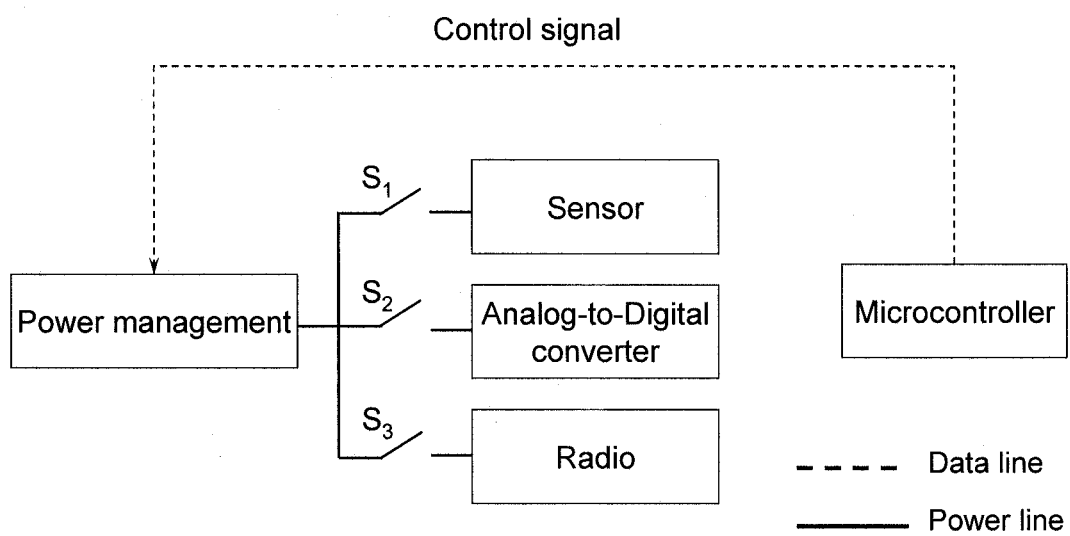
FIG. 9 shows a block scheme of a WATS system with switch modules (on/off).

A first possible embodiment is to use switches between the power management and the WATS system loads (see FIG. 9). In this case, a digital control signal is given by the μC to the system power management unit. The microcontroller signals to the power management unit which of the switch modules have to be put in 'Open' or 'Close' state. When one of the switch modules is in 'Open' state the corresponding WATS module will be disconnected. As a result, the component contribution to the standby and leakage power is eliminated from the total WATS system power consumption.

Figure 10:
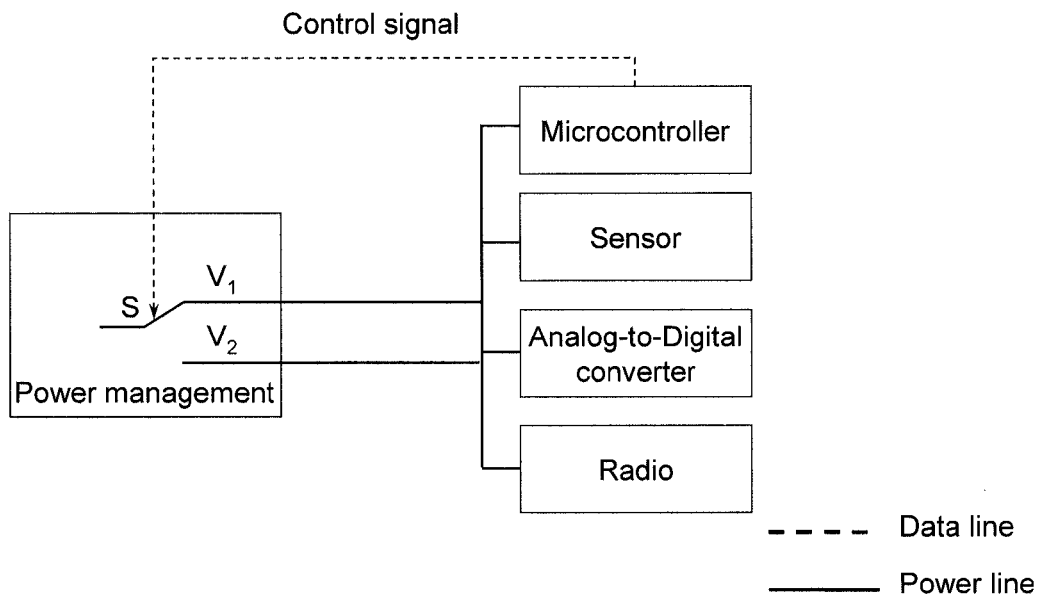
FIG. 10 shows a block scheme of a WATS system with switch modules between different voltage levels.

In another possible embodiment the power supply voltage for each of the WATS components may be actively controlled between two (or more) voltage levels. The control signal to the power management module is given by the microcontroller based on information retrieved from the internal registers (see FIG. 10). The advantage of such an implementation may be a fast start-up time of the WATS components. A combination of the two discussed embodiments is also possible. In both situations the internal power management registers of the microcontroller can be used to signals which components have to be put in a specific power mode. The appropriate mode is determined and set by the CPU core of the microcontroller.

Similar to the microcontroller system the power consumed by the sensing unit in a WATS system is a contribution of the active ($P_{sensor}$) and standby or leakage ($P_{sensor}^L$) power. The equations below describe the power calculation during the active and standby states $$P_{sensor}=V_{dd}I_{sensor}^{ON} \qquad \text{Equation 6}$$

$$P_{sensor}^L=V_{dd}I_{sensor}^L \qquad \text{Equation 7}$$

It may be concluded from the examples above that the WATS system power consumption may be estimated by combining predefined measurements with information retrieved from the WATS components registers.

Figure 11:
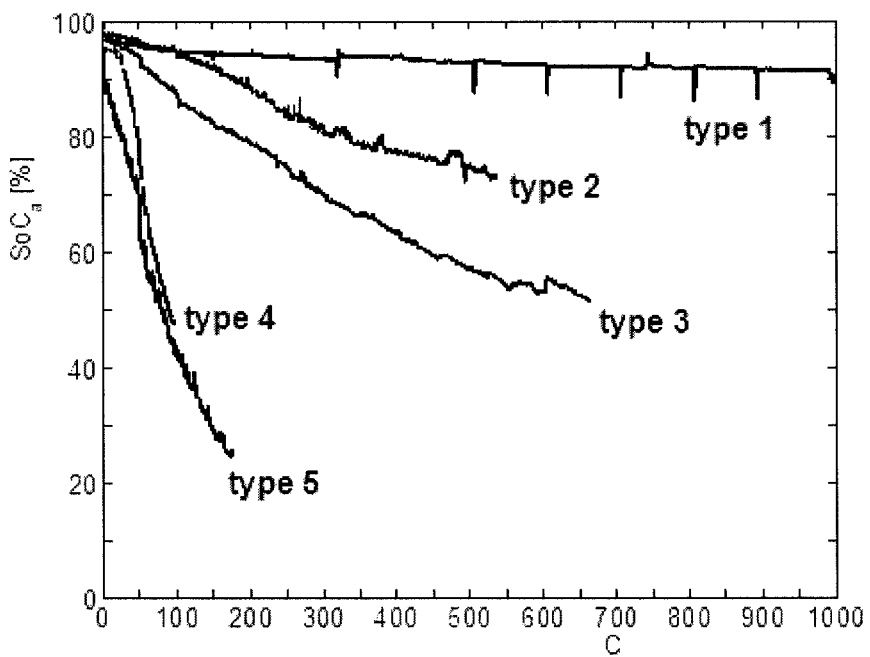
FIG. 11 shows a plot illustrating the degradation of a number of storage systems.

Next to the power generated by energy harvesting device, the properties of the energy storage system also need to be studied. During usage of wireless autonomous systems the capacity of the integrated energy storage system (ESS) will degrade, as illustrated in FIG. 11 wherein the state-of-charge during cycling ($SoC_a$) is plotted over time for different types of batteries. The $SoC_a$ has been calculated each cycle by dividing the measured ESS capacity to the reference maximum ESS capacity. ESSs have been always fully charged. After a rest step, a discharge has been considered until the defined End-of-Discharge level has been reached. After a rest step a 'Deep-Discharge' step at a low C-rate current has been applied until the defined End-of-Discharge level has been reached.

Figure 12:
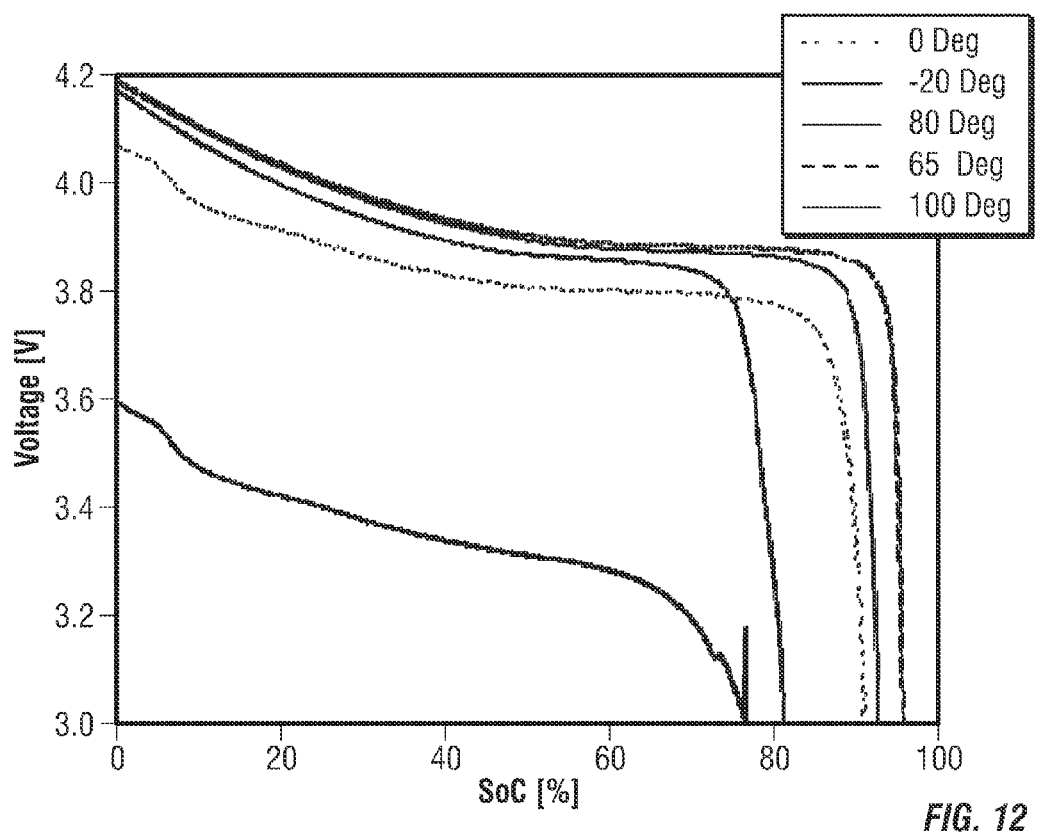
FIG. 12 shows a plot illustrating the reversible capacity loss as a function of the temperature for an energy storage system (ESS).

Subsequently, when ESSs are used at low temperatures, e.g. about −20 to 0° C., the available capacity is much lower when compared with the ESS capacity available at higher temperatures, e.g. about 25 to 100° C. FIG. 12 shows the reversible capacity loss shown by the ESS voltage during discharge for one ESS as a function of the temperature. The SoC has been calculated each discharge by dividing the measured ESS capacity to the reference maximum ESS capacity. ESSs have been always fully charged. After a rest step, a discharge has been considered until the End-of-Discharge level has been reached.

Figure 13:
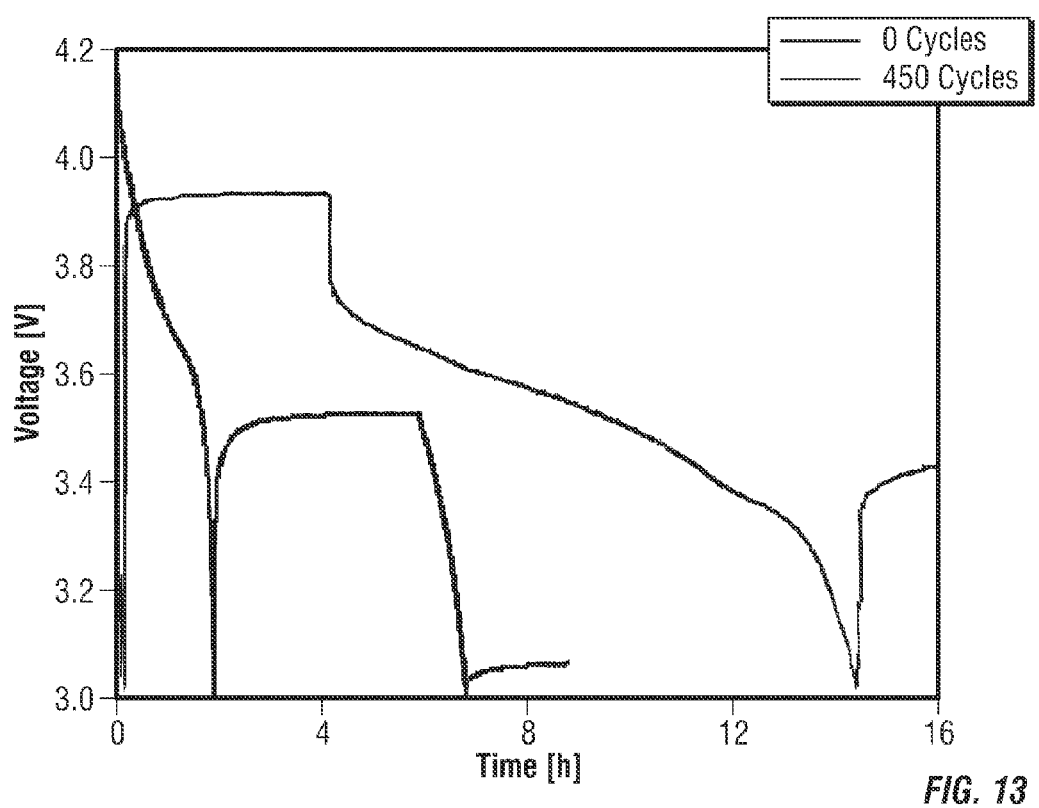
FIG. 13 illustrates the WATS autonomy decrease at lower temperatures.
Figure 14:
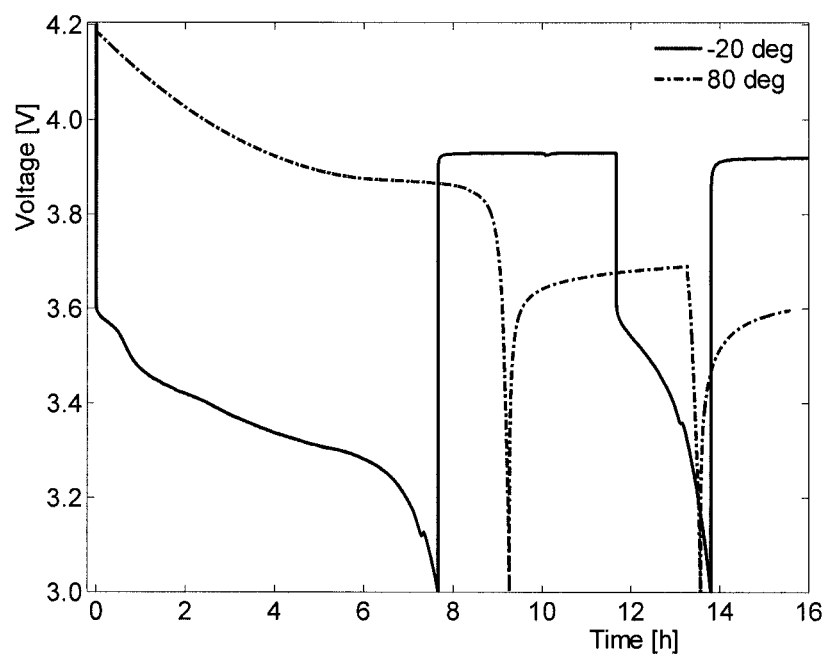
FIG. 14 illustrates the WATS autonomy decrease during ESS degradation.

A wireless autonomous system usually operates under various temperature conditions and at a constant average discharging current or load over time. As a result, the autonomy of the wireless autonomous system will decrease at lower temperatures and/or over time. In FIGS. 13 and 14 a typical example of the WATS autonomy decrease due to usage during the ESS degradation and at lower temperatures for two ESSs is illustrated, where the same result has been confirmed by measuring other ESSs also. Therefore the wireless autonomous system average discharge current or load needs to be adapted with the temperature or/and during the energy storage system aging. This prevents the power consuming parts from drawing more energy than available in the energy storage system which enables system autonomy for longer periods of time compared to a system without adaptive energy usage. It is thereby prevented that no data is collected and/or transmitted during a certain amount of time, which might be unacceptable for certain applications.

Figure 15A:
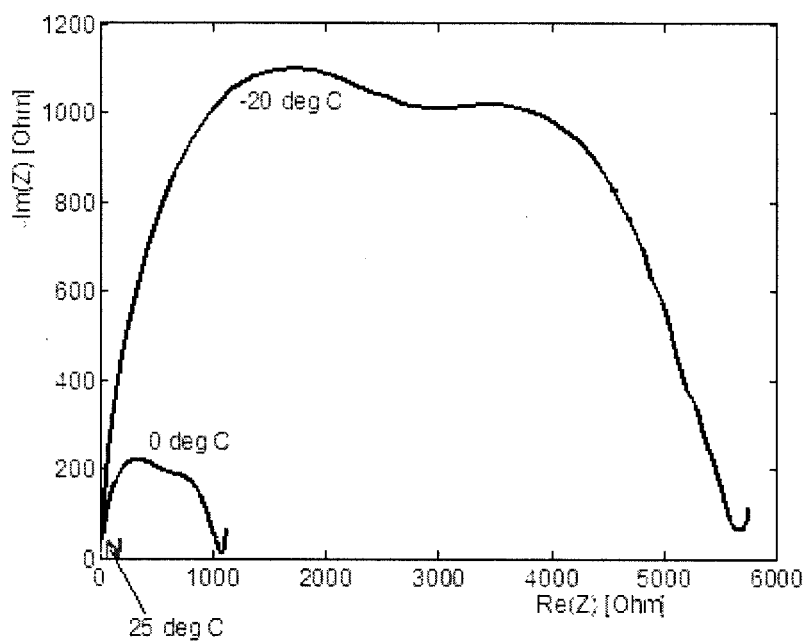
FIG. 15 shows a plot of the impedance of a storage system measured as a function of (a) aging and (b) temperature.
Figure 15B:
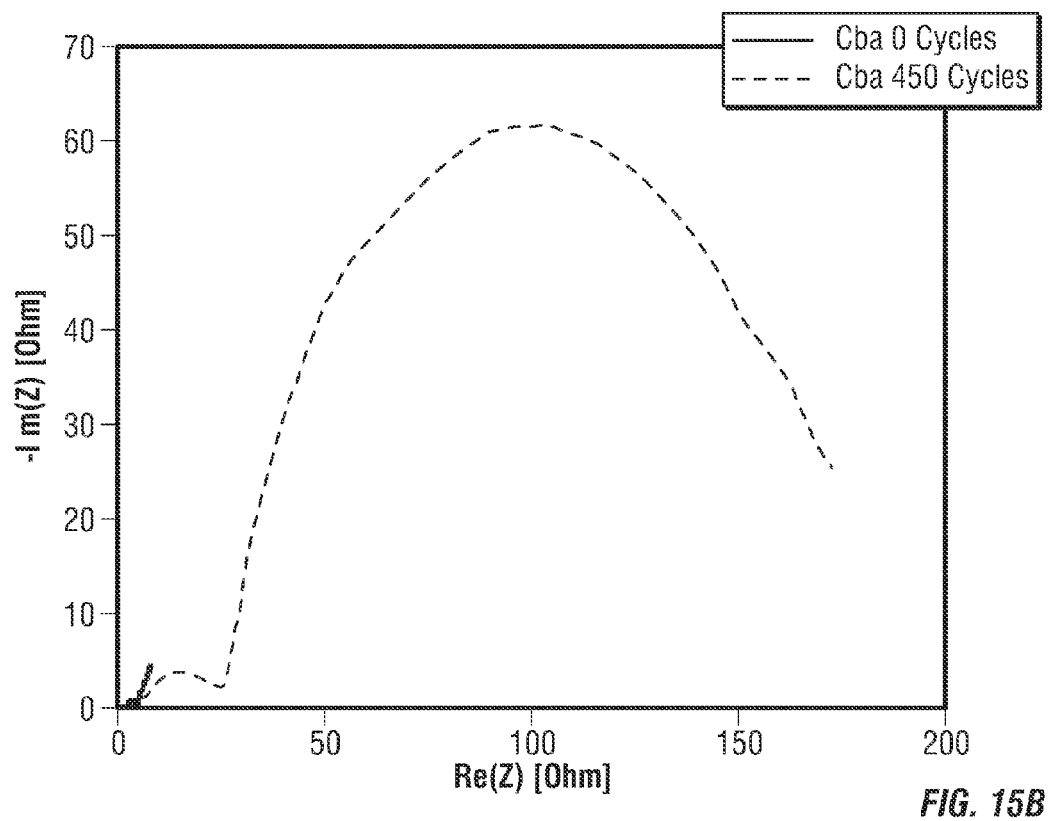
Figure 16A:
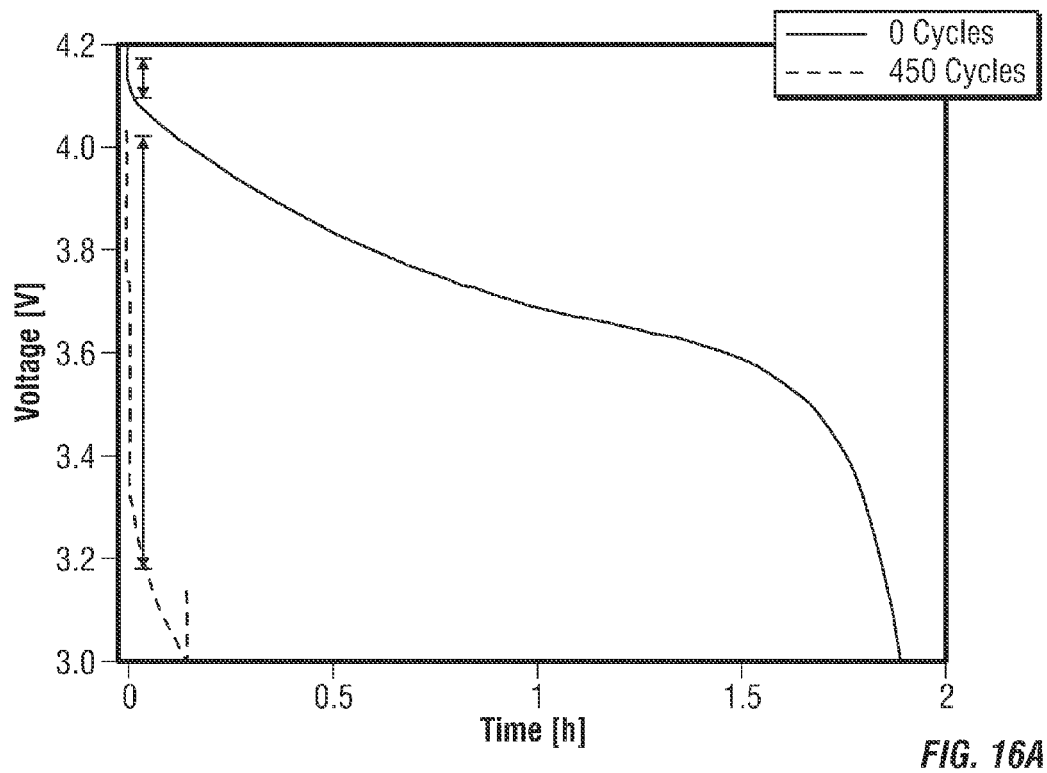
FIG. 16 shows a plot of the discharge profiles and voltage drop of a storage system measured as a function of (a) aging and (b) temperature.
Figure 16B:
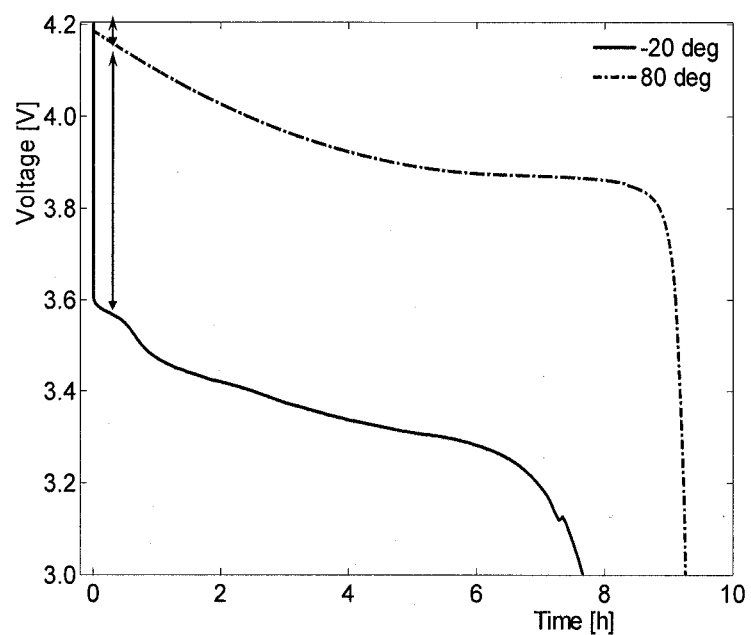

A first possible solution for the adaptation process is to measure the ESS impedance, see FIG. 15, which decreases with the temperature and increases with ESS degradation. Another possible embodiment is to monitor the change in the ESS voltage-drop during discharging time (see FIG. 16) at the specific discharge current. In both cases, an increase in the impedance or/and voltage-drop values with temperature and/or cycling may be used as input for calculating an optimum discharge average current. A combination of these two measured parameters is also possible. The decreasing of the average discharge current may be realized by, for example, adding an adaptive capacitor filtering network in the WATS system design. A second possible solution is to reduce the communication traffic through the WATS with the aged ESS. With this solution, data will then still be collected continuously, only the time interval between the readings will increase, but this interval between charging periods of the energy storage will remain constant. A third possible solution is to use an adaptive supply voltage for the WATS loads. The adaption of this voltage supply will be function of the temperature and ESS aging. In this case a decrease in the supply voltage with the decrease in the temperature and/or with the ESS aging will also decrease the average current and power consumption.

In another embodiment, the evolution in the voltage of the energy storage system is measured. An increase or decrease in the ESS voltage can be used for determining a link between the generated and consumed power.

Figure 17:
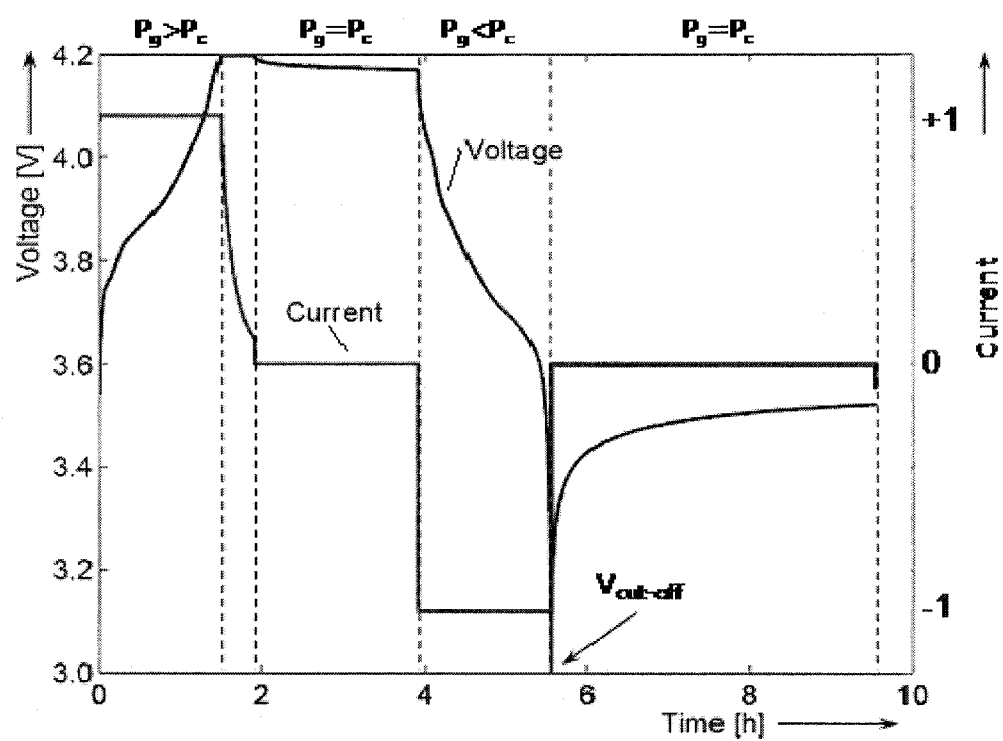
FIG. 17 shows a plot of the voltage for an ESS as a function of the experiment time during different states of the WATS system.

An increase in the ESS voltage shows that the power consumed ($P_c$) by the WATS loads is higher than the power generated ($P_g$) by energy harvesting (see FIG. 17)

A decrease in the ESS voltage value shows that the power consumed by the WATS loads is lower than the power generated by energy harvesting (see FIG. 17)

A constant ESS voltage value shows that the power consumed by the WATS loads equals the power generated by energy harvesting (see FIG. 17)

This relative behavior will be stored over time. Function of the ESS voltage change, the functionality of the wireless autonomous system is indicated. In a first case, when the ESS voltage decreases over time the activity of the WATS system should be reduced. In a possible embodiment this can be realized by reducing the application period. In another possible embodiment the supply voltage of the WATS functional blocks may be actively decreased. The reduction factor is adapted as function of the ESS voltage evolution. In a second case, when the ESS voltage increases over time, an increase in the WATS activity may be realized without reducing the WATS autonomy. By combining the two cases an optimal usage of the WATS system may be found when the ESS voltage remains constant over time.

In order to predict the autonomy duration, the power generated by energy harvesting needs also to be estimated. For this purpose information regarding the increase or decrease in the battery voltage (see for example FIG. 3) is combined with information on the battery maximum-capacity and battery State-of-Charge (SoC) values $$P_g = V_{av} * Q_{max} * \Delta SoC / \Delta t \qquad \text{Equation 8}$$

where $Q_{max}$ denotes the battery maximum-capacity in [mAh], $\Delta SoC$ denotes the difference between two SoC values in % measured in a predefined time difference $\Delta t$ in [s] and $V_{av}$ denotes the battery average voltage in [V] measured within this $\Delta t$ interval.

It should be noted that Equation 8 takes also into account a possible efficiency loss due to the power management circuit between the harvester and battery. So, only the useful power generated by the harvester to the battery is taken into account in the $P_g$ calculation. By replacing Equation 8 into Equation 1 and taking into account the efficiency of the power management circuit between the battery and the loads ($\eta_{PM}$) [%] one obtains $$P_b = P_g - P_c \qquad \text{Equation 9}$$
$$= V_{bat} * Q_{max} * \frac{\Delta SoC}{\Delta t} \frac{\eta_{PM}(I_{total}, V_{bat}, V_{dd})}{100} - P_c \geq 0$$

where $V_{bat}$ denotes the battery voltage and $I_{total}$ denotes the total current consumption over the loads, i.e. radio, ADC, μC, and sensor, in [μA]. When no power management circuit is considered between battery and the load then $$\frac{\eta_{PM}(I_{total}, V_{bat}, V_{dd})}{100} = 1.$$

In order to meet the condition given by Equation 9 the $P_c$ value needs to be continuously adapted to the $P_g$ value generated under the application environment. This adaptation process may be used for learning and prediction of the most optimum system usage over time under various application conditions. Additionally, the battery maximum-capacity and battery life-time optimization may also be taken into account during the learning and prediction process.

During the $P_c$ adaptation process $T_{Tx}$ and $T_s$ need to be adapted such that the result obtained by applying equation 9 is higher than 0.

It follows from these figures that the autonomy duration is mainly dependent on

The current consumption during the standby and active (transmission and sampling) states The transmission and sampling periods repetition time The power generated by the energy harvester When these variables are determined by the methods described here the system autonomy is enabled under any application conditions. In order to integrate the method described by the equations 2-9 the total number of operations performed by the microcontroller will increase. In this case, the active time-period of the microcontroller when implementing the algorithm ($T_{\mu C\_active}^{method\_ID}$) is higher than the normal active time-period ($T_{\mu C\_active}$). This situation is described by $$T_{\mu C\_active}^{method\_ID} = T_{\mu C\_active} + \frac{N_{operation}^{method\_ID}}{f_{CLK}^{\mu C}} \qquad \text{Equation 10}$$

where $N_{operations}^{method\_ID}$ denotes the number of operations executed to implement the method operations described in this ID and $f_{CLK}^{\mu C}$ denotes the μC clock frequency.

Figures 18A, 18B, 18C, 18D, 18E, 18F:
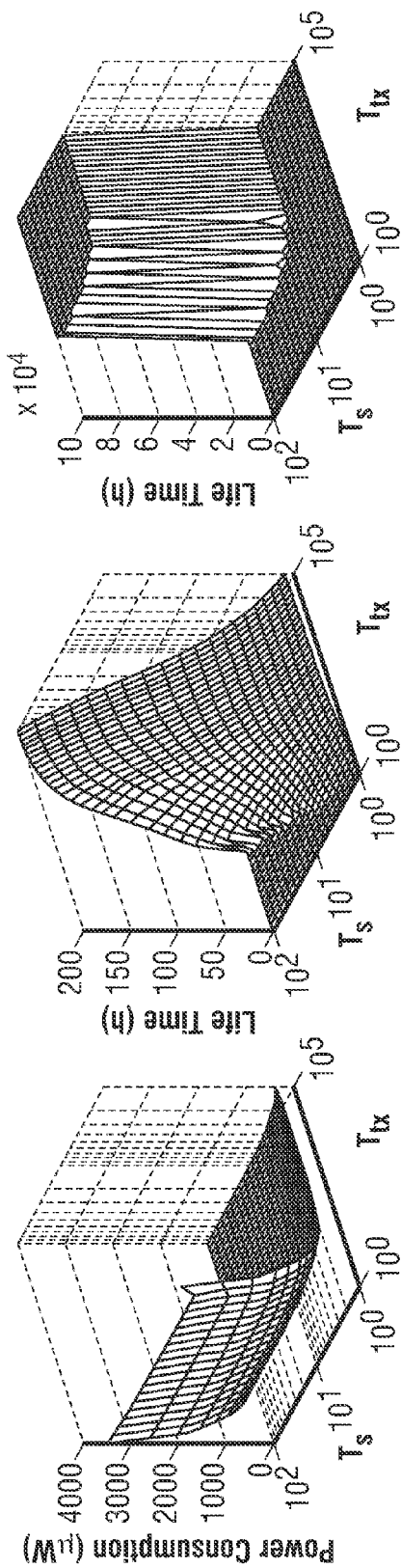
FIG. 18 shows plots illustrating the power trends and autonomy duration with and without an energy harvester.

An example of power consumption and autonomy duration calculation is given in FIG. 18 where $T_{\mu C\_active}$ equals 80 μs, $N_{operations}^{method\_ID}$ (worst case scenario for solving and implementing the equations given in this patent) and $f_{CLK}^{\mu C}$ equals 5 MHz. So, $T_{\mu C\_active}^{method\_ID}$ equals 20 μs. In this example, the adaptation process used for learning and prediction of the most optimum system usage over time is performed at every 10 seconds. It follows from FIG. 18 that implementing the method according to certain embodiments does not have an impact on the system power consumption and autonomy duration. So, the system autonomy is enabled without significant impact on the system power consumption.

Illustrative Example

Use of Power Diagnosis Tool for Body Area Networks

In the context of biomedical applications, different signals can be measured from the human body, for example EMG and ECG signals. EMG and ECG are techniques for evaluating and recording the activation signal of muscles. Table 2 summarizes the EMG and ECG application specifications at the electronics level.

TABLE 2

| Application parameter at the electronics level | Value EMG application | Value ECG application |
|---|---|---|
| Reception interval [ms] | 1000 | 1000 |
| Number of bits reception [bit] | 12 | 12 |
| Transmission interval [ms] | 140 | 35 |
| Number of bits per sample (transmission) [bit] | 12 | 12 |
| Sampling interval [ms] | 2.5 | 2.5 |
| Transmission/reception range [m] | 10 | 10 |

The transmission (reception) interval denotes the time with which the data packets are transmitted (received). It follows from the table above that the transmission interval for the EMG application is lower than that of the ECG application. The impact of this parameter on the WATS power consumption and autonomy will be discussed.

Information about the power generation and consumption of every WATS block under various conditions have been obtained based on the manufacturer datasheets, measurement of the power consumption and generation at block level. For example, the ADC unit on MSP430F1611 µC has been characterized on the µC evaluation board as function of sampling frequency and voltage reference. The ADC power consumption in terms of internal and external voltage reference of V at sampling intervals of 10 and 100 ms, has been measured. The results are shown in the table 3.

TABLE 3

| Voltage reference | Sampling interval [ms] | Average power consumption [µW] |
|---|---|---|
| Internal | 2.5 | 64 |
|  | 10 | 27 |
|  | 100 | 11 |
| External (2 µW consumption) | 2.5 | 50 |
|  | 10 | 23 |
|  | 100 | 11 |

It can be concluded from the ADC measurement results that the power consumption under an external ADC reference is lower in most cases, especially when the sampling frequency is relatively high. Furthermore, a stable external ADC reference may also guarantee higher accuracy during the sampling operation.

A. Power Diagnosis Tool; Results by WATS Architectural Level Modeling

Figure 19:
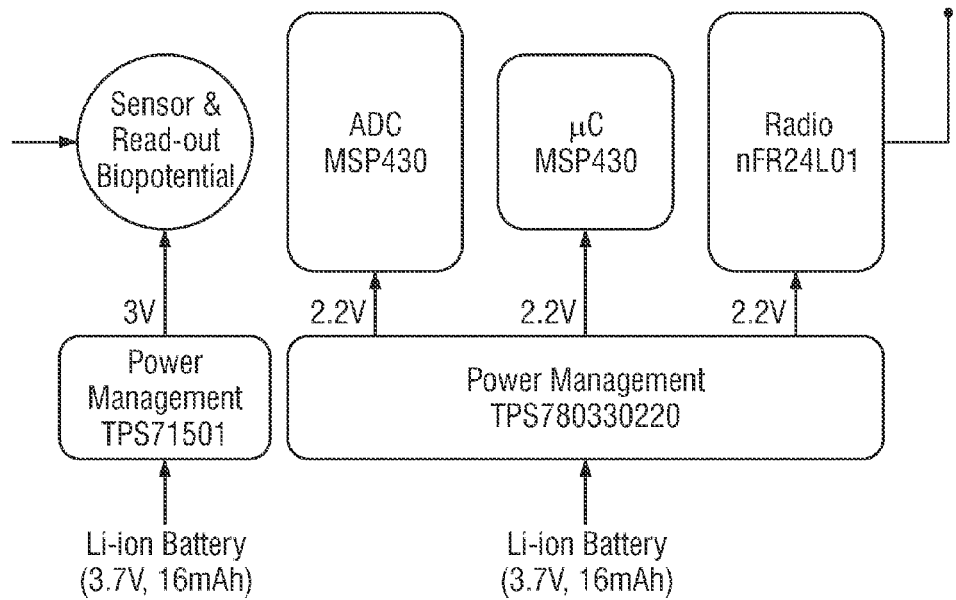
FIG. 19 shows a block diagram of a WATS system.
Figure 20:
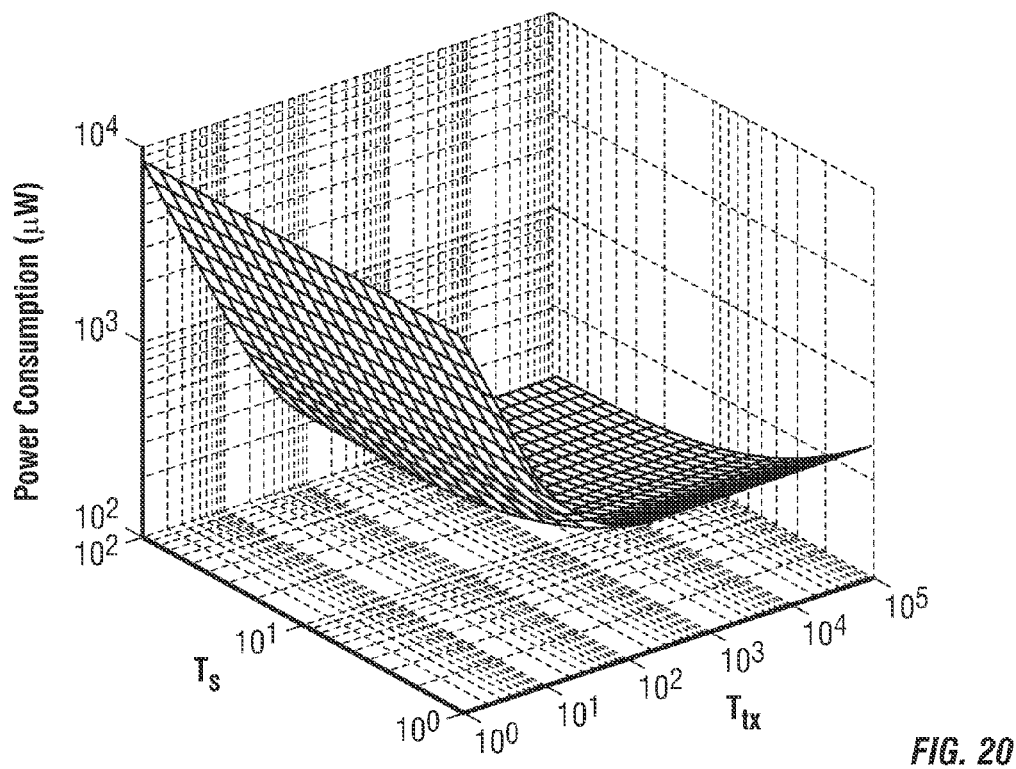
FIG. 20 illustrates the power consumption trend for a WATS system.
Figure 21:
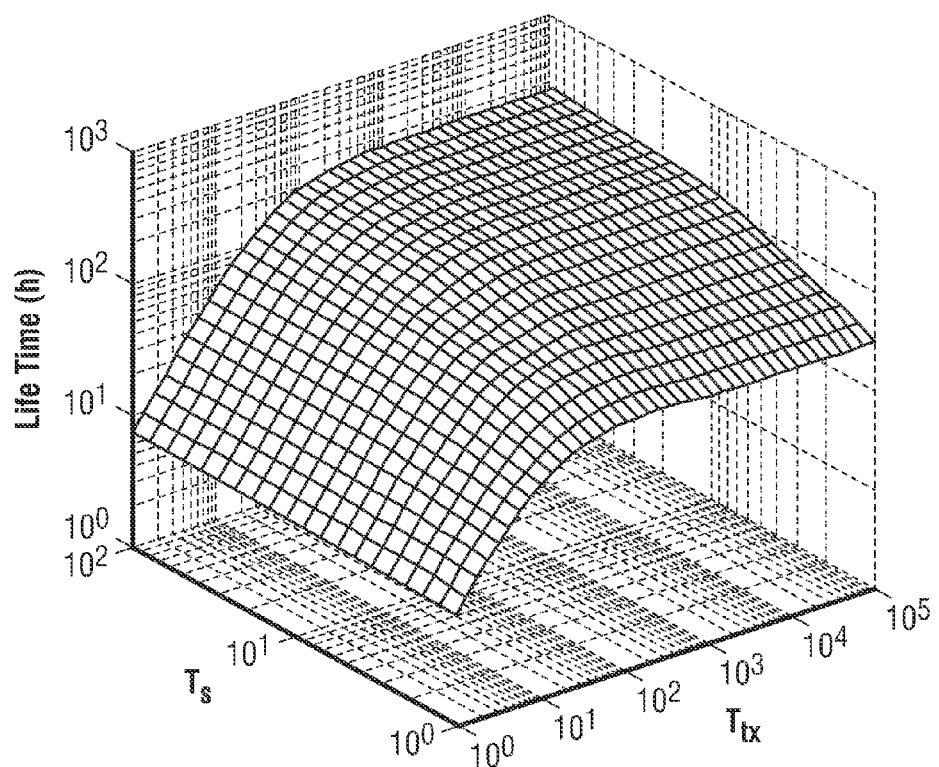
FIG. 21 illustrates the autonomy for a WATS system.

The power consumption obtained for a WATS based on off-the-shelf blocks for an EMG application has been firstly estimated. The system blocks are illustrated in FIG. 19. The power management (PM) (32% of total power budget), radio (RF) (26% of total power budget), sensor and read-out blocks (25% of total power budget) are the key power consumption blocks. The power consumption of the RF and ADC blocks (10%) is mainly attributed to the high power levels consumed by these blocks during the active, i.e. Tx/Rx and sampling, modes. In order to better understand the impact of the ADC sampling interval (Ts) [ms] and radio transmission interval (Ttx) [ms] the WATS power consumption and autonomy are plotted as function of these parameters in FIG. 20 and FIG. 21, respectively. It follows from these figures that the power consumption (autonomy) importantly increases (decreases) at faster sampling and transmission intervals.

B. Impact of Low-Power Electronics Technology on Power Consumption and Autonomy

Figure 23:
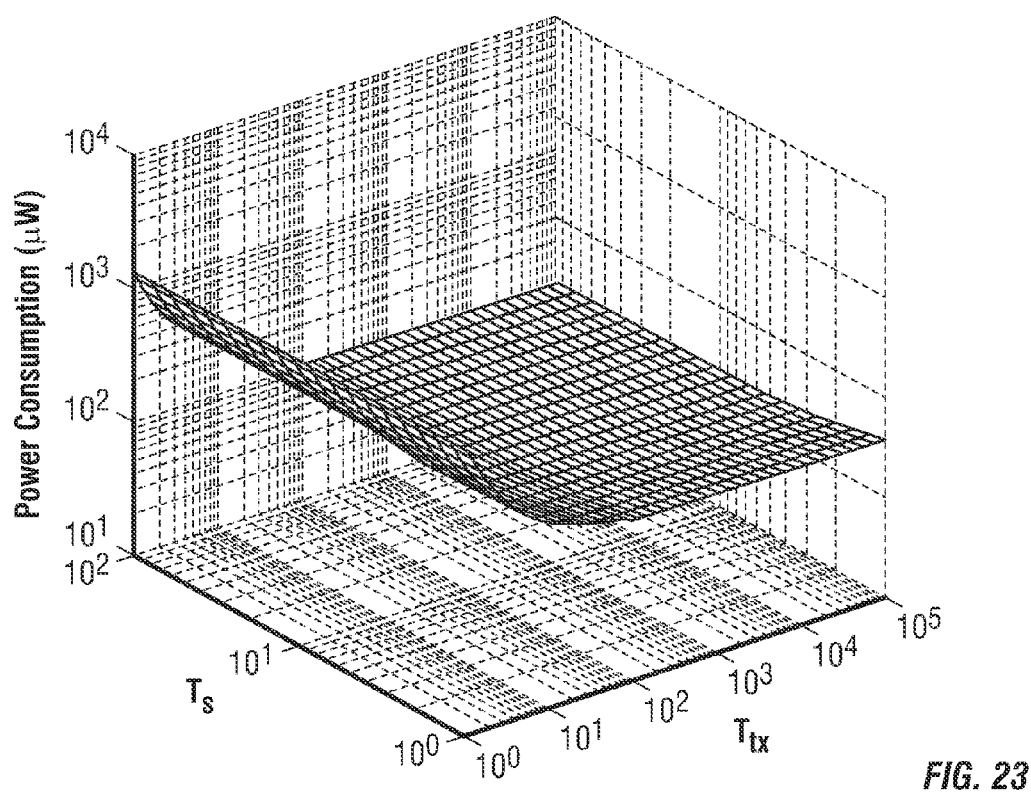
FIG. 23 illustrates the power consumption trend for a WATS system.
Figure 24:
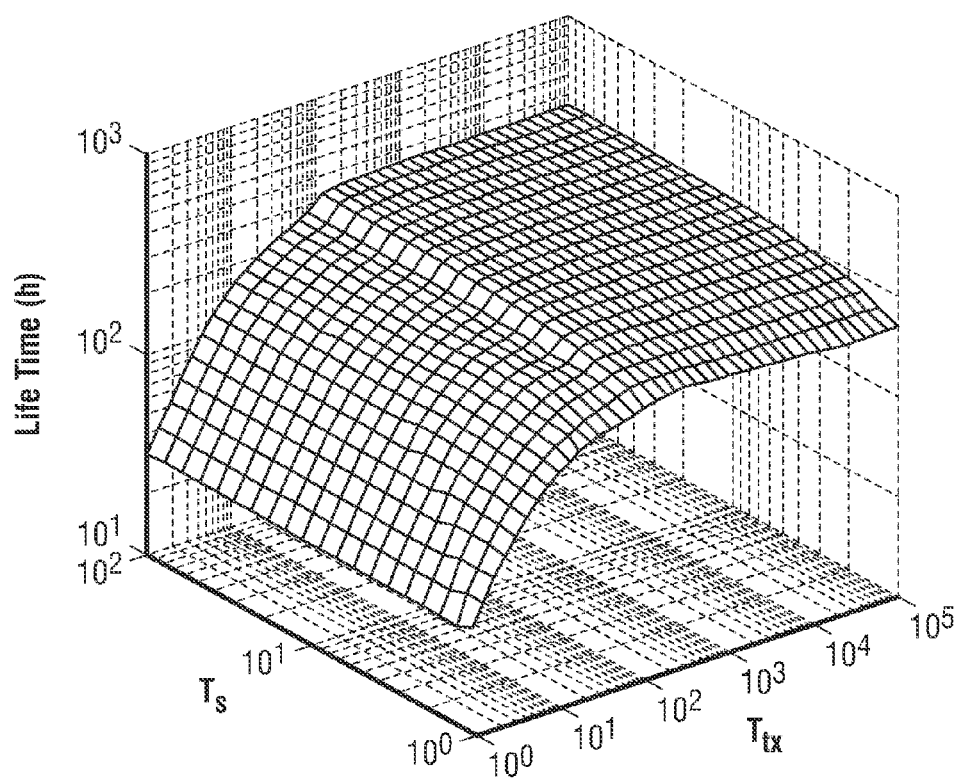
FIG. 24 illustrates the autonomy for a WATS system.

In a second example, the power diagnosis for an optimized WATS (see FIG. 22) is shown. The total power consumption of the WATS system has been reduced to 122 µW. This is explained by a lower power consumption of the PM (18%), ADC (<1%) and radio blocks (10%) during the active modes. For comparison, the power consumption and autonomy under extended transmission and sampling conditions are plotted in FIGS. 23, 24 and 25. It follows that the power consumption (autonomy) levels are in most of the cases lower (higher) for the WATS architecture designed according to the proposed method.

C. Impact of Energy Harvesting Technology on the Application Autonomy

Figure 22:
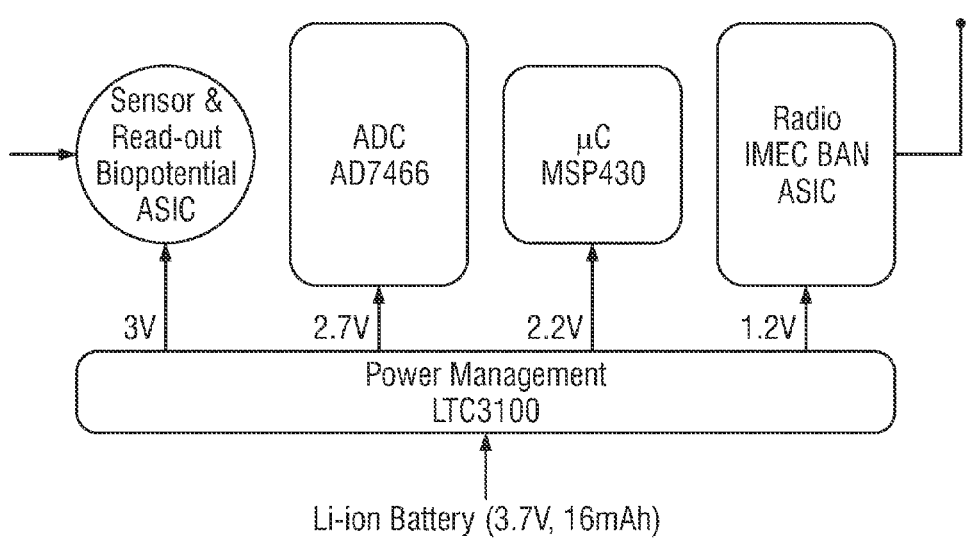
FIG. 22 shows a block diagram of a WATS system.
Figure 25:
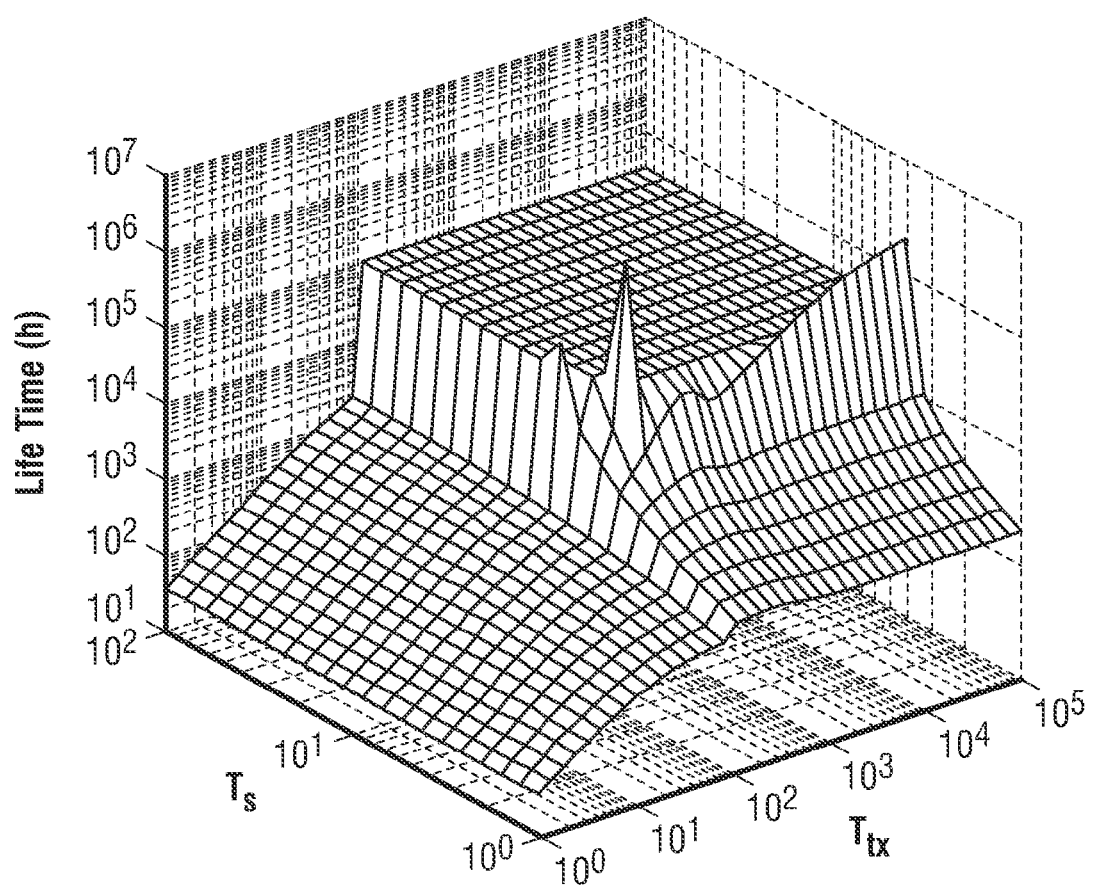
FIG. 25 illustrates the autonomy for a WATS system.

The impact of the energy harvesting on the WATS autonomy is discussed in this section. In this case, an energy harvester generating 200 µW of power at 4V and the system illustrated in FIG. 22 are considered. FIG. 25 illustrates the autonomy as function of Ts [ms] and Ttx [ms]. It follows from this figure that an autonomous WATS may be enabled by energy harvesting under limiting application transmission and sampling intervals.

D. Comparison: EMG Versus ECG BAN Applications

For comparison the power estimation and autonomy results obtained under the EMG and ECG application specifications are given in the table below. It follows from this table that important improvements have been achieved for both EMG and ECG applications by implementing energy harvesting and the low-power electronics technology. As example, a factor of about 17 and 5, respectively, longer autonomy is enabled under the EMG and ECG, respectively, application conditions when compared with the architecture designed with off-the-shelf electronics.

TABLE 4

| Application parameter at the electronics level | Value EMG application | Value ECG application |
|---|---|---|
| Power consumption (off the shelf) [µW] | 300 | 480 |
| Power consumption (IMEC) [µW] | 122 | 164 |
| Autonomy without energy harvesting (off the shelf) [h] | 130 | 95 |
| Autonomy with energy harvesting (off the shelf) [h] | 221 | 134 |
| Autonomy with energy harvesting (IMEC) [h] | 3694 | 726 |

Ultra-low power electronics are integrated with energy systems, i.e. energy storage and harvesting, within a developed power generation consumption diagnosis tool for BAN applications. A comparison is shown for WATS architectures with different choices of functional blocks, i.e. processor, radio, etc., under realistic ElectroMyoGram (EMG) and ElectroCardioGram (ECG) monitoring applications. By applying the power diagnosis tool the key power consumers at the WATS architectural level are identified. An optimized system based on the low-power electronics technology is analyzed. The results show the effectiveness of our modeling approach for improving the WATS autonomy. Subsequently, the importance of the energy harvesting and low-power electronics technology within the BAN application domain is also revealed.

Figure 26:
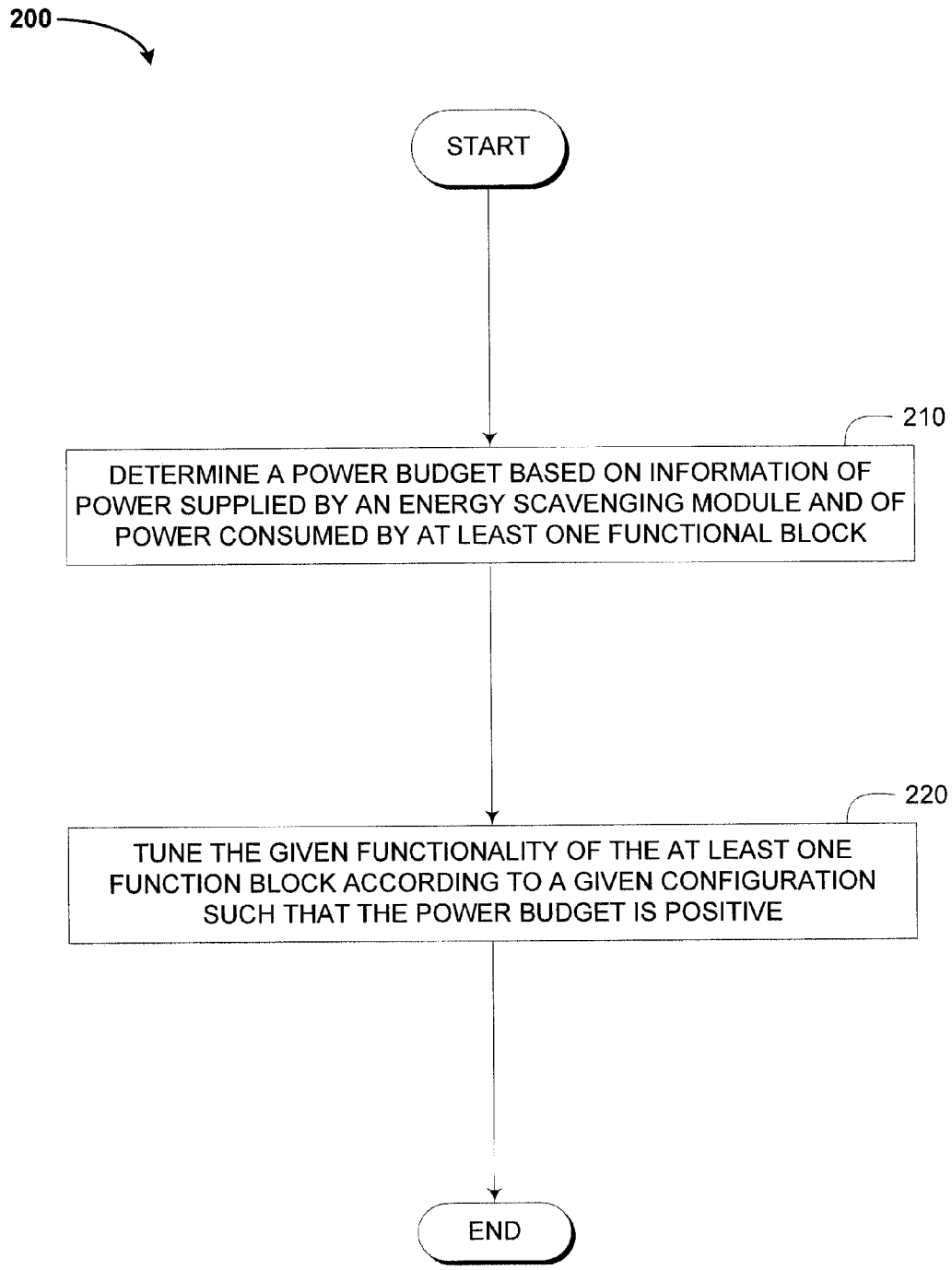
FIG. 26 shows a flowchart of one embodiment of a method of managing the power budget of an autonomous transducer system.

FIG. 26 shows a flowchart of one embodiment of a method of managing the power budget of an autonomous transducer system. The method 200 includes, at a block 210, determining a power budget based on information of power supplied by an energy scavenging module and of power consumed by at least one functional block of a load circuit of the transducer system. The method may further include, at a block 220, tuning the given functionality of the at least one function block according to a given configuration such that the power budget is positive.

The foregoing embodiments of methods are embodied in the form of various discrete blocks. In one embodiment, the functions of any one or more of those blocks may be realized, for example, by one or more appropriately programmed processors or devices.

It is to be noted that the processor or processors may be a general purpose, or a special purpose processor, and may be for inclusion in a device, e.g., a chip that has other components that perform other functions. Thus, one or more aspects of the present invention can be implemented in digital electronic circuitry, or in computer hardware, firmware, software, or in combinations of them. Furthermore, aspects of the invention can be implemented in a computer program product stored in a computer-readable medium for execution by a programmable processor. Method steps of aspects of the invention may be performed by a programmable processor executing instructions to perform functions of those aspects of the invention, e.g., by operating on input data and generating output data. Accordingly, the embodiment includes a computer program product which provides the functionality of any of the methods described above when executed on a computing device. Further, the embodiment includes a data carrier such as for example a CD-ROM or a diskette which stores the computer product in a machine-readable form and which executes at least one of the methods described above when executed on a computing device.

The foregoing description details certain embodiments of the disclosure. It will be appreciated, however, that no matter how detailed the foregoing appears in text, the disclosure may be practiced in many ways. It should be noted that the use of particular terminology when describing certain features or aspects of the disclosure should not be taken to imply that the terminology is being re-defined herein to be restricted to including any specific characteristics of the features or aspects of the disclosure with which that terminology is associated.

While the above detailed description has shown, described, and pointed out novel features of the disclosure as applied to various embodiments, it will be understood that various omissions, substitutions, and changes in the form and details of the device or process illustrated may be made by those skilled in the technology without departing from the scope of the disclosure.

What is claimed is:

1. An autonomous transducer system comprising:
an energy scavenging module;
an energy storage module;
a load circuit comprising at least one functional block providing a given functionality; and
a power management module configured to provide power supplied by the energy scavenging module to the load circuit or to exchange power with the energy storage module, wherein the power management module comprises a tuning module configured to tune the at least one functional block of the load circuit according to a given configuration scheme and based on information stored internally in the load circuit wherein the power management module further comprises circuitry for measuring a temporal voltage behavior of the energy storage module, and wherein the temporal voltage behavior is taken into account in the given configuration scheme.

2. The autonomous transducer system according to claim 1, wherein the power management module further comprises a power budget module configured to propagate and determine a power budget based on information of the power supplied by the energy scavenging module and of power consumed by the at least one functional block.

3. The autonomous transducer system according to claim 2, wherein the given configuration scheme is at least partly selected based on the power budget.

4. The autonomous transducer system according to claim 2, wherein the given functionality of the at least one functional block is tuned according to the given configuration such that the power budget is positive.

5. The autonomous transducer system according to claim 2, wherein the power budget module is configured to determine the power budget taking the dynamic power consumption and the leakage power of the at least one functional block into account.

6. The autonomous transducer system according to claim 2, wherein the power budget module is configured to determine the power budget taking storage properties of an energy storage module into account.

7. The autonomous transducer system according to claim 1, wherein the given configuration scheme is at least partly selected based on external settings and/or user defined parameters.

8. The autonomous transducer system according to claim 1, wherein the at least one functional block of the load circuit comprises a plurality of tunable parameters for setting the given configuration scheme.

9. The autonomous transducer system according to claim 1, wherein the tuning module is configured to tune the given functionality by adapting the sampling frequency of an analog to digital converter and/or adapting the frequency of transmission and/or reception.

10. A method of managing the power budget of an autonomous transducer system, the method comprises:
determining a power budget based on information of power supplied by an energy scavenging module and of power consumed by at least one functional block of a load circuit of the transducer system;
tuning the given functionality of the at least one function block according to a given configuration and based on information stored internally in the load circuit such that the power budget is positive; and
measuring a temporal voltage behavior of an energy storage module, wherein the given configuration scheme is at least partly selected based on the temporal voltage behavior.

11. The method of managing the power budget of an autonomous transducer according to claim 10, wherein the process of tuning the given functionality comprises adapting the sampling frequency of an analog to digital converter and/or adapting the frequency of transmission and/or reception.

12. The method of managing the power budget of an autonomous transducer according to claim 10, wherein the process of determining the power budget takes the dynamic power consumption and the leakage power of the at least one functional block into account.

13. The method of managing the power budget of an autonomous transducer according to claim 10, wherein the process of determining the power budget takes storage properties of an energy storage module into account.

14. The method of managing the power budget of an autonomous transducer according to claim 10, wherein the given configuration scheme is at least partly selected based on the power budget.

15. The method of managing the power budget of an autonomous transducer according to claim 10, wherein the given configuration scheme is at least partly selected based on external settings and/or user defined parameters.

16. An autonomous transducer system comprising:
   means for scavenging energy;
   means for storing energy;
   means for providing at least one functional block;
   means for providing power supplied by the energy scavenging means to the functional block providing means or for exchanging power with the energy storage means, wherein the power providing or exchanging means comprises means for tuning the at least one functional block of the functional block providing means according to a given configuration scheme and based on information stored internally in the functional block providing means; and
   means for measuring a temporal voltage behavior of the energy storing means, wherein the given configuration scheme is at least partly selected based on the temporal voltage behavior.

17. The autonomous transducer system according to claim 16, wherein the power providing or exchanging means further comprises means for determining a power budget based on information of the power supplied by the energy scavenging means and of power consumed by the at least one functional block.

* * * * *

UNITED STATES PATENT AND TRADEMARK OFFICE
CERTIFICATE OF CORRECTION

PATENT NO. : 8,832,468 B2
APPLICATION NO. : 13/174396
DATED : September 9, 2014
INVENTOR(S) : Pop et al.

Page 1 of 1

It is certified that error appears in the above-identified patent and that said Letters Patent is hereby corrected as shown below:

In the Specification

In column 4 at line 45, change "$P_b = P_g - P_c > 0$" to --$P_b = P_g - P_c \geq 0$--.

In column 5 at line 64, change "most," to --most--.

In column 11 at line 28, change "V" to --1.5V--.

In column 11 at line 29, change "10" to --2.5, 10--.

In the Claims

In column 13 at line 65, in Claim 1, change "circuit" to --circuit,--.

Signed and Sealed this
Thirty-first Day of March, 2015

Michelle K. Lee
*Director of the United States Patent and Trademark Office*